US012645982B2

(12) United States Patent
Han et al.

(10) Patent No.: US 12,645,982 B2
(45) Date of Patent: Jun. 2, 2026

(54) INTERACTIVE DECISION TREE MODIFICATION

(71) Applicant: International Business Machines Corporation, Armonk, NY (US)

(72) Inventors: Si Er Han, Xi'an (CN); Bei Chen, Blanchardstown (IE); Jing Xu, Xi'an (CN); Jing James Xu, Xi'an (CN); Xue Ying Zhang, Xi'an (CN); Jun Wang, Xi'an (CN); Ji Hui Yang, Beijing (CN); Dakuo Wang, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1160 days.

(21) Appl. No.: 17/314,669

(22) Filed: May 7, 2021

(65) Prior Publication Data

US 2022/0358399 A1     Nov. 10, 2022

(51) Int. Cl.
*G06N 20/00* (2019.01)
*G06N 5/01* (2023.01)

(52) U.S. Cl.
CPC .............. *G06N 20/00* (2019.01); *G06N 5/01* (2023.01)

(58) Field of Classification Search
CPC .................................. G06N 5/01; G06N 20/00
See application file for complete search history.

(56) References Cited

U.S. PATENT DOCUMENTS

| | | | |
|---|---|---|---|
| 8,606,737 B2 | 12/2013 | Shimada et al. | |
| 8,930,262 B1 * | 1/2015 | Searson | G06N 20/00 705/38 |
| 9,495,426 B2 | 11/2016 | Meng | |
| 10,417,704 B2 | 9/2019 | Searson | |

(Continued)

FOREIGN PATENT DOCUMENTS

| | | | |
|---|---|---|---|
| CN | 103473473 A | * 12/2013 | G06F 17/18 |
| CN | 110909888 A | 3/2020 | |

(Continued)

OTHER PUBLICATIONS

Elzen et al. (BaobabView: Interactive Construction and Analysis of Decision Trees) (Year: 2011).*

(Continued)

*Primary Examiner* — David Yi
*Assistant Examiner* — Syed Rayhan Ahmed
(74) *Attorney, Agent, or Firm* — Edward J. Wixted, III

(57) ABSTRACT

An approach is provided in which a method, system, and program product display, on a user interface, at least one of a set of node split parameters in response to receiving a first user selection that selects a node in a decision tree. The selected node branches to a set of child nodes in the decision tree based on the set of node split parameters. The method, system, and program product adjust at least one of the set of node split parameters of the selected node in response to receiving a second user selection. The method, system, and program product modify the decision tree based on the adjusted set of node split parameters. The modified decision (Continued)

tree includes a modified set of child nodes that branch from the selected node based on the adjusted set of node split parameters.

24 Claims, 10 Drawing Sheets

(56) References Cited

U.S. PATENT DOCUMENTS

| | | | | |
|---|---|---|---|---|
| 11,720,600 | B1 * | 8/2023 | Dixit | G06N 20/00 |
| | | | | 707/738 |
| 2003/0061213 | A1 | 3/2003 | Yu | |
| 2004/0117336 | A1 | 6/2004 | Basak | |
| 2007/0179966 | A1 | 8/2007 | Li | |
| 2012/0066260 | A1 | 3/2012 | Li | |
| 2013/0006915 | A1 | 1/2013 | Gunawardana | |
| 2013/0117280 | A1 * | 5/2013 | Donaldson | G06F 16/17 |
| | | | | 707/754 |
| 2015/0339364 | A1 * | 11/2015 | Aoki | G06F 16/26 |
| | | | | 707/737 |
| 2016/0048566 | A1 | 2/2016 | Meng | |
| 2018/0260531 | A1 | 9/2018 | Nori | |
| 2019/0122139 | A1 * | 4/2019 | Perez | G06N 20/00 |
| 2019/0197141 | A1 | 6/2019 | Gomez | |
| 2020/0211103 | A1 * | 7/2020 | Searson | G06N 20/00 |
| 2020/0387832 | A1 * | 12/2020 | Jordan | G06N 5/04 |
| 2021/0027315 | A1 * | 1/2021 | Nanavati | G06Q 30/0201 |

FOREIGN PATENT DOCUMENTS

| | | | | |
|---|---|---|---|---|
| JP | 2024-518329 | A | 5/2024 | |
| WO | WO-0137120 | A2 * | 5/2001 | G06F 16/2428 |
| WO | 2010/116450 | A1 | 10/2010 | |
| WO | 2022/233254 | A1 | 11/2022 | |

OTHER PUBLICATIONS

Wang et al. (Investigating the Evolution of Tree Boosting Models with Visual Analytics, Apr. 2021) (Year: 2021).*

International Search Report and Written Opinion for PCT/CN2022/089270, National Intellectual Property Administration, Beijing, China, mailed Jun. 29, 2022, 9 pages.

Japan Patent Office, "Notice of Reasons for Refusal" Aug. 5, 2025, 12 Pages, JP Application No. 2023-565950.

Koji Makino, Artificial Intelligence Algorithm Expedition, Part 30, Extended Version of Decision Tree : "Random Forest", Interface, vol. 45, No. 9, Japan, CQ Publishing Co., Ltd., Sep. 1, 2019, pp. 124-132.

Ozaki Kohei, "xfeat: Feature Engineering and Exploration Library", github [online], 2020, p. 1-11, Reterived from <https://github.com/pfnet-research/xfeat/blob/master/_docs/xfeat_slides.pdf>.

* cited by examiner

Information Handling System
Processor and Components

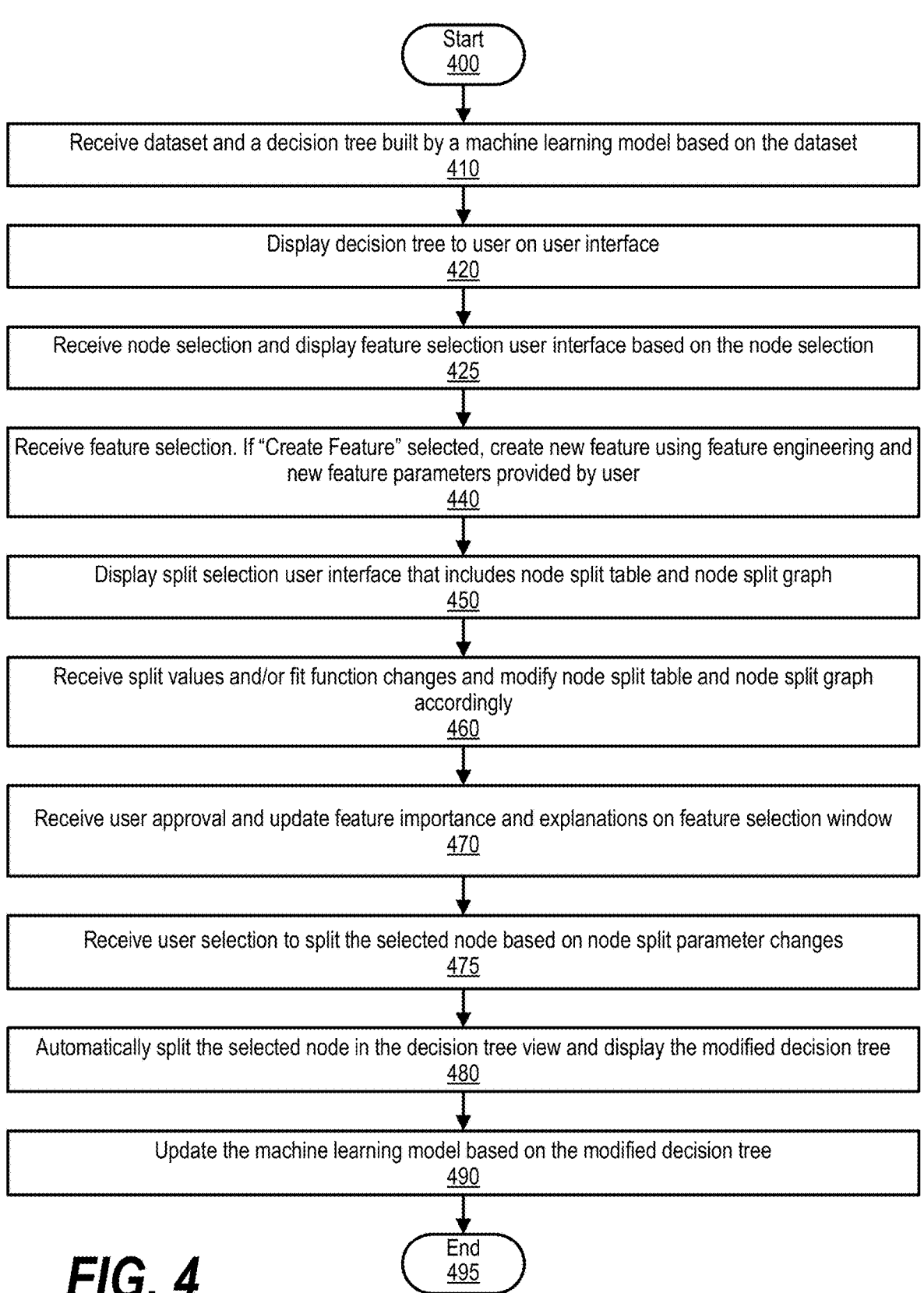

Start
400

Receive dataset and a decision tree built by a machine learning model based on the dataset
410

Display decision tree to user on user interface
420

Receive node selection and display feature selection user interface based on the node selection
425

Receive feature selection. If "Create Feature" selected, create new feature using feature engineering and new feature parameters provided by user
440

Display split selection user interface that includes node split table and node split graph
450

Receive split values and/or fit function changes and modify node split table and node split graph accordingly
460

Receive user approval and update feature importance and explanations on feature selection window
470

Receive user selection to split the selected node based on node split parameter changes
475

Automatically split the selected node in the decision tree view and display the modified decision tree
480

Update the machine learning model based on the modified decision tree
490

End
495

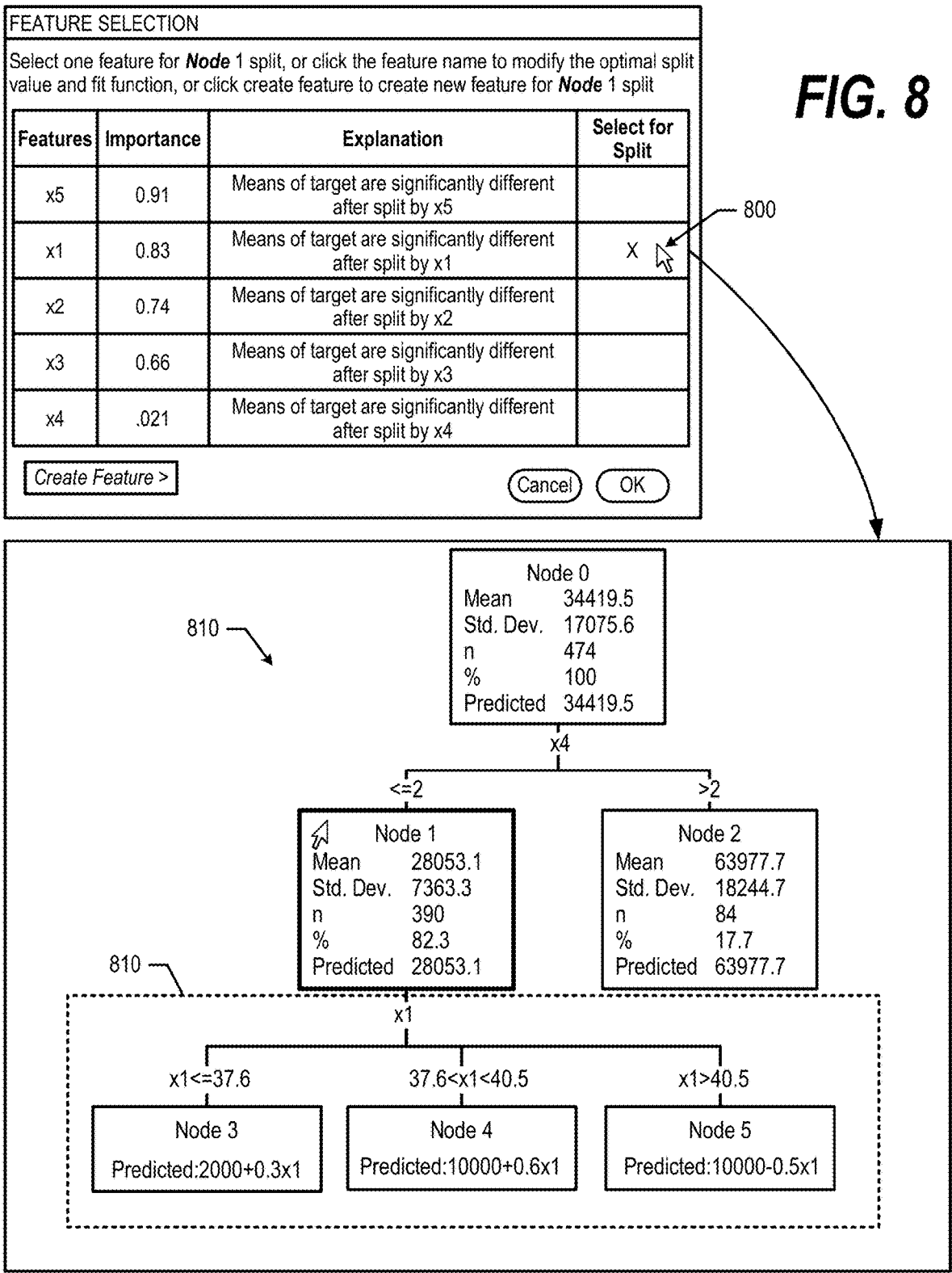

FEATURE SELECTION

Select one feature for *Node* 1 split, or click the feature name to modify the optimal split value and fit function, or click create feature to create new feature for *Node* 1 split

| Features | Importance | Explanation | Select for Split |
|---|---|---|---|
| x5 | 0.91 | Means of target are significantly different after split by x5 | |
| x1 | 0.83 | Means of target are significantly different after split by x1 | X |
| x2 | 0.74 | Means of target are significantly different after split by x2 | |
| x3 | 0.66 | Means of target are significantly different after split by x3 | |
| x4 | .021 | Means of target are significantly different after split by x4 | |

Create Feature >                    Cancel      OK

— 800

810 —

Node 0
| | |
|---|---|
| Mean | 34419.5 |
| Std. Dev. | 17075.6 |
| n | 474 |
| % | 100 |
| Predicted | 34419.5 | x4

<=2                    >2

Node 1
| | |
|---|---|
| Mean | 28053.1 |
| Std. Dev. | 7363.3 |
| n | 390 |
| % | 82.3 |
| Predicted | 28053.1 |

Node 2
| | |
|---|---|
| Mean | 63977.7 |
| Std. Dev. | 18244.7 |
| n | 84 |
| % | 17.7 |
| Predicted | 63977.7 |

810 — x1 x1<=37.6          37.6<x1<40.5          x1>40.5

Node 3
Predicted:2000+0.3x1

Node 4
Predicted:10000+0.6x1

Node 5
Predicted:10000-0.5x1

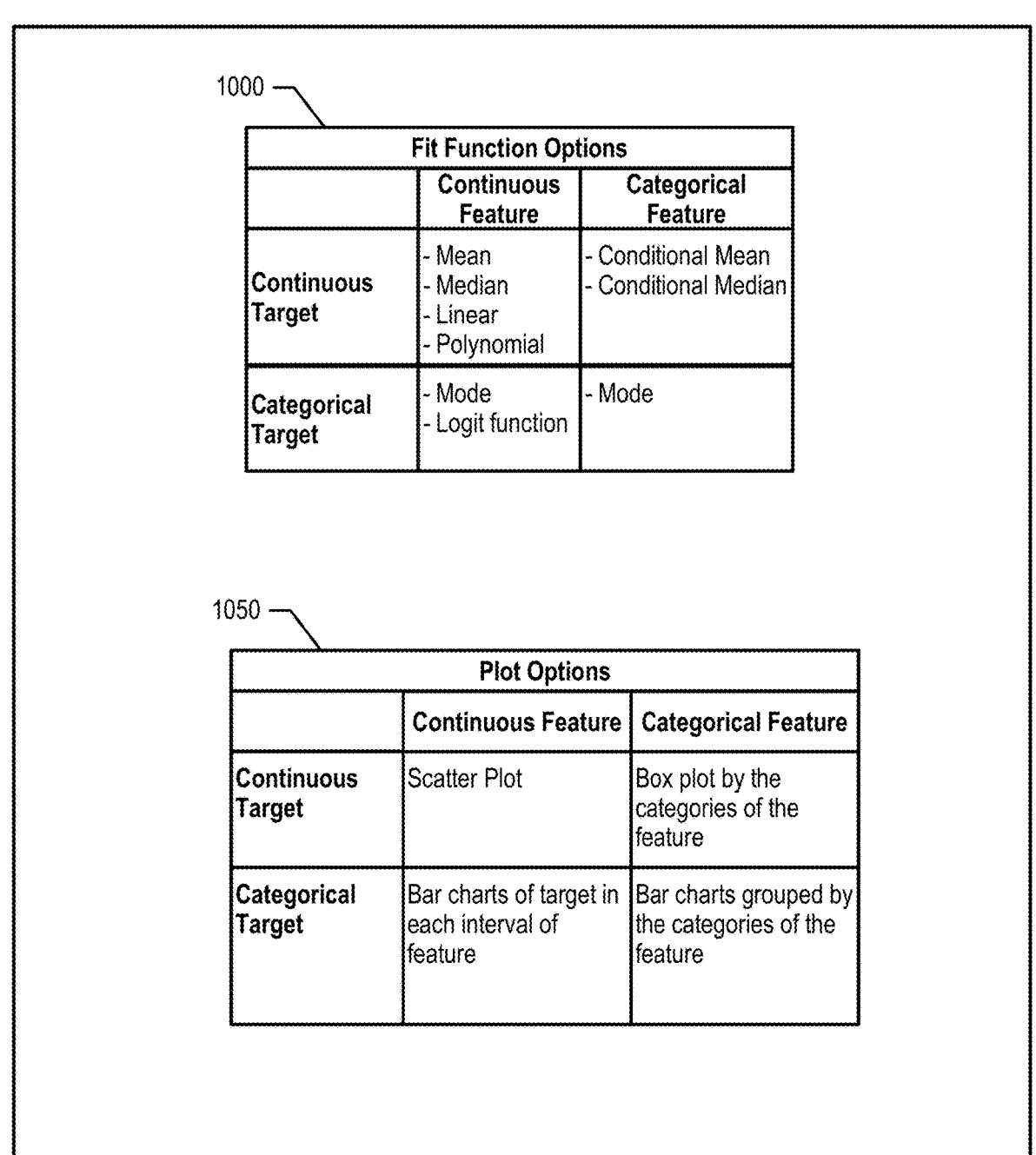

1000

| Fit Function Options | Continuous Feature | Categorical Feature |
|---|---|---|
| Continuous Target | - Mean<br>- Median<br>- Linear<br>- Polynomial | - Conditional Mean<br>- Conditional Median |
| Categorical Target | - Mode<br>- Logit function | - Mode |

1050

| Plot Options | Continuous Feature | Categorical Feature |
|---|---|---|
| Continuous Target | Scatter Plot | Box plot by the categories of the feature |
| Categorical Target | Bar charts of target in each interval of feature | Bar charts grouped by the categories of the feature |

*FIG. 10*

INTERACTIVE DECISION TREE MODIFICATION

BACKGROUND

Predictive modeling is a process that uses data and statistics to predict outcomes with data models. Predictive modeling is often referred to as predictive analytics, predictive analysis, and machine learning. Machine learning (ML) is the study of computer algorithms that automatically improve through experience.

Machine learning algorithms build machine learning models based on sample data, known as training data, to make predictions or decisions without being explicitly programmed. The process of training a machine learning model involves providing a machine learning algorithm with the training data from which to learn, and the artifact created from the training process is the machine learning model. The training data includes correct answers that are referred to as targets or target attributes, and the machine learning algorithm finds patterns in the training data that map input data attributes to the target attributes and outputs a machine learning model that captures the patterns.

Machine learning models may use several different types of algorithms based on the type of problem they are designed to solve, one of which is a decision tree algorithm. A decision tree algorithm belongs to the family of supervised learning algorithms and, unlike other supervised learning algorithms, the decision tree algorithm can also be used for solving regression and classification problems. The decision tree algorithm is one of the more popular predictive model representations in machine learning because it can be used to visually and explicitly represent decisions and decision making.

At the start of machine learning training, the decision tree algorithm considers a whole training set as the root node, which represents the entire population or sample. Decision tree algorithms then use multiple approaches for node splitting, which is a process of dividing a node into two or more sub-nodes that can be broadly divided into two categories based on the type of target variable (e.g., continuous target variables or categorical target variables). Creating sub-nodes increases the homogeneity of resultant sub-nodes. In other words, the purity of a node increases with respect to the target variable. The decision tree algorithm splits the nodes on all available variables and then selects the split which results in most homogeneous sub-nodes.

At runtime, decision tree machine learning models start at the "root" of the tree to predict a class label for a record. The machine learning model compares the values of the root attribute with the record's attribute. On the basis of comparison, the machine learning model follows the branch corresponding to that value and jumps to the next node.

A challenge found in implementing a decision tree algorithm is identifying the attributes to consider at each level's decision node, which involves different measures to identify an attribute to consider as the root node at each level. Although conventional decision tree fitting allows a user to set hyper parameter values (e.g., max tree depth, max records in parent node, etc.), real-world data science problems have objectives and constraints initiated by multiple stakeholders and reach beyond statistical accuracy, such as regulatory, deployment, code, and computing infrastructure considerations. These objectives and constraints are currently not considered when building a decision tree, especially when splitting a node in the decision tree.

BRIEF SUMMARY

According to one embodiment of the present disclosure, an approach is provided in which a method, system, and program product display, on a user interface, at least one of a set of node split parameters in response to receiving a first user selection that selects a node in a decision tree. The selected node branches to a set of child nodes in the decision tree based on the set of node split parameters. The method, system, and program product adjust at least one of the set of node split parameters of the selected node in response to receiving a second user selection. The method, system, and program product modify the decision tree based on the adjusted set of node split parameters. The modified decision tree includes a modified set of child nodes that branch from the selected node based on the adjusted set of node split parameters. In this embodiment, the method, system, and program product enable a user to modify node split parameters in a decision tree to control the decision tree growth according to the user's constraints and objectives.

According to another embodiment of the present disclosure, an approach is provided in which the set of node split parameters comprises at least one of a node split feature, a node split fit function, and a set of node split values. In this embodiment, the method, system, and program product enable the user to adjust a selected node's node split feature, node split fit function, and/or node split values according to the user's constraints and objectives.

According to another embodiment of the present disclosure, an approach is provided in which a method, system, and program product determine that the second user selection selects a different node split feature. The method, system, and program product display a node split graph that is based on the different node split feature. In response to displaying the node split graph, the method, system, and program product receive a third user selection that selects a different node split fit function. The method, system, and program product display a different node split graph that is based on the different node split feature and the different node split fit function. In this embodiment, the method, system, and program product provide a graphical user interface of a selected node's splitting criteria and allow the user to change the selected node's split feature and fit function using the graphical user interface according to the user's constraints and objectives.

According to another embodiment of the present disclosure, the different node split graph comprises a set of split value indicators corresponding to the set of node split values. The method, system, and program product receive a fourth user selection that comprises a different set of node split values. The method, system, and program product modify the set of split value indicators on the different node split graph based on the different set of node split values. In this embodiment, the method, system, and program product provide a graphical user interface of a selected node's splitting criteria and allow the user to modify split values of the selected node using the graphical user interface according to the user's constraints and objectives.

According to another embodiment of the present disclosure, an approach is provided in which a method, system, and program product display the modified decision tree in response to receiving a user authorization to modify the decision tree. The modified set of child nodes displayed on the modified decision tree is based on the modified feature, the modified fit function, and the modified set of node split values. In this embodiment, the method, system, and program product implement user-specified node split changes into the decision tree to control the decision tree growth according to the user's constraints and objectives.

According to another embodiment of the present disclosure, an approach is provided in which a method, system, and program product display a statistical plot of records on the node split graph. The method, system, and program product modify a view of the statistical plot of records in response to displaying the different node split graph. In this embodiment, the method, system, and program product provide a graphical user interface that plots records of a selected node, modifies the view of the records when a user selects a different node split feature and a different node split fit function, and provides the user with a visual representation of the different node split features and the different node split fit function.

According to another embodiment of the present disclosure, an approach is provided in which a method, system, and program product determine that the selected different node split feature corresponds to a new node split feature. The method, system, and program product create the new node split feature based on one or more feature engineering parameters received from the user. The method, system, and program product display the node split graph based on the new node split feature. In this embodiment, the method, system, and program product enable a user to create a new node split feature using feature engineering and applying the new node split feature to a selected node.

According to another embodiment of the present disclosure, an approach is provided in which a method, system, and program product, prior to receiving the first user selection, train a machine learning model using a dataset. The trained machine learning model generates the decision tree based on the dataset and the method, system, and program product display the decision tree on the user interface. The method, system, and program product modify the machine learning model based on the modified decision tree. In this embodiment, the method, system, and program product enable provide a graphical user interface that allows a user to modify a machine learning model's decision tree according to the user's constraints and objectives.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 4 is an exemplary diagram depicting steps taken to dynamically modify node-splitting criteria in a decision tree;

FIG. 8 is an exemplary diagram depicting a user confirming a set of node split parameter changes to a decision tree;

FIG. 10 is an exemplary diagram depicting fit function options and plot options based on a selected feature and a target.

DETAILED DESCRIPTION

Figure 1:
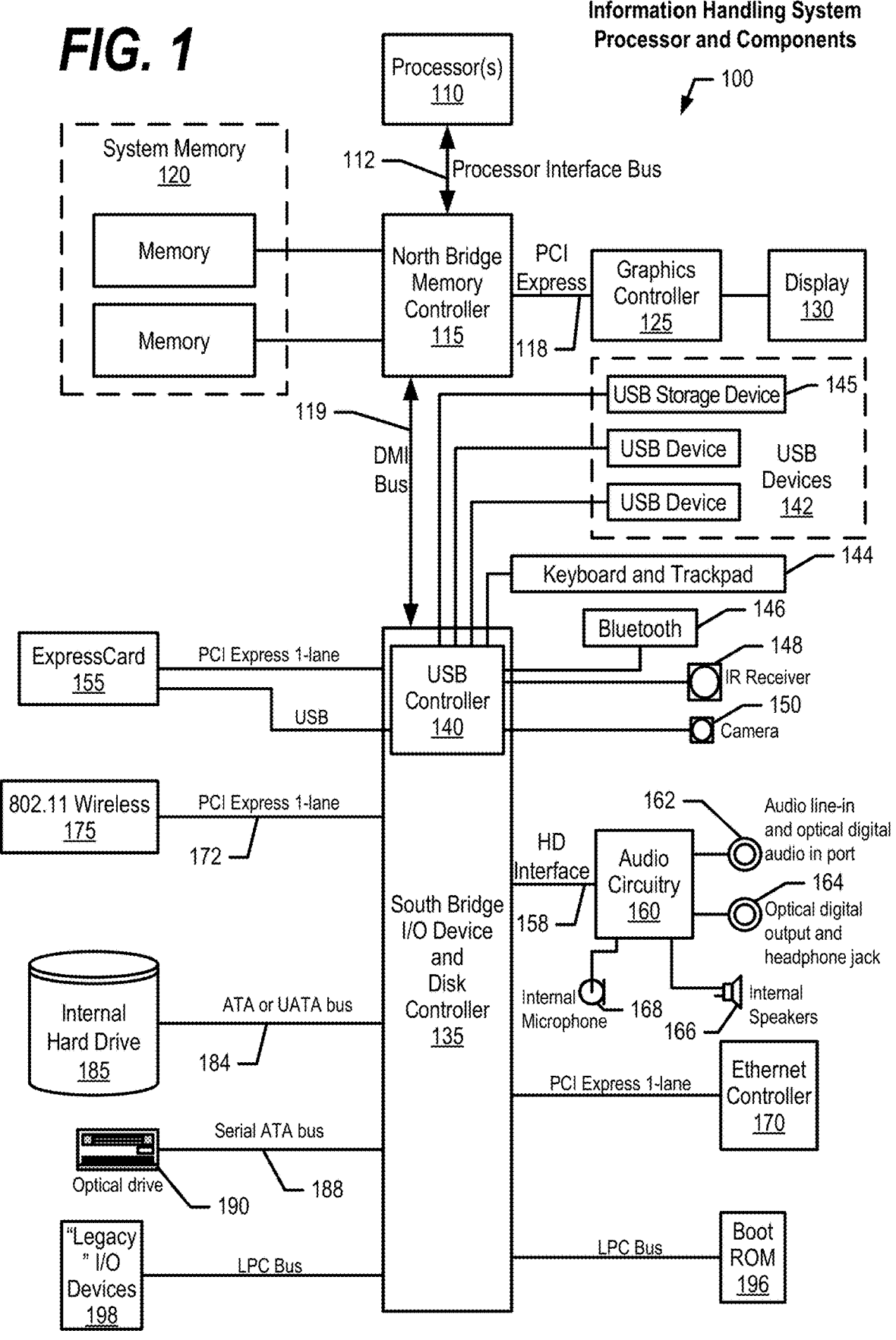
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, Peripheral Component Interconnect (PCI) Express bus 118 connects Northbridge 115 to graphics controller 125. Graphics controller 125 connects to display device 130, such as a computer monitor.

Northbridge 115 and Southbridge 135 connect to each other using bus 119. In some embodiments, the bus is a Direct Media Interface (DMI) bus that transfers data at high speeds in each direction between Northbridge 115 and Southbridge 135. In some embodiments, a PCI bus connects the Northbridge and the Southbridge. Southbridge 135, also known as the Input/Output (I/O) Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and Universal Serial Bus (USB) connectivity as it connects to Southbridge 135 using both the USB and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, Integrated Services Digital Network (ISDN) connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the Institute of Electrical and Electronic Engineers (IEEE) 802.11 standards of over-the-air modulation techniques that all use the same protocol to wireless communicate between information handling system 100 and another computer system or device. Optical storage device 190 connects to Southbridge 135 using Serial Analog Telephone Adapter (ATA) (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality associated with audio hardware such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, Automated Teller Machine (ATM), a portable telephone device, a communication device or other devices that include a processor and memory.

Figure 2:
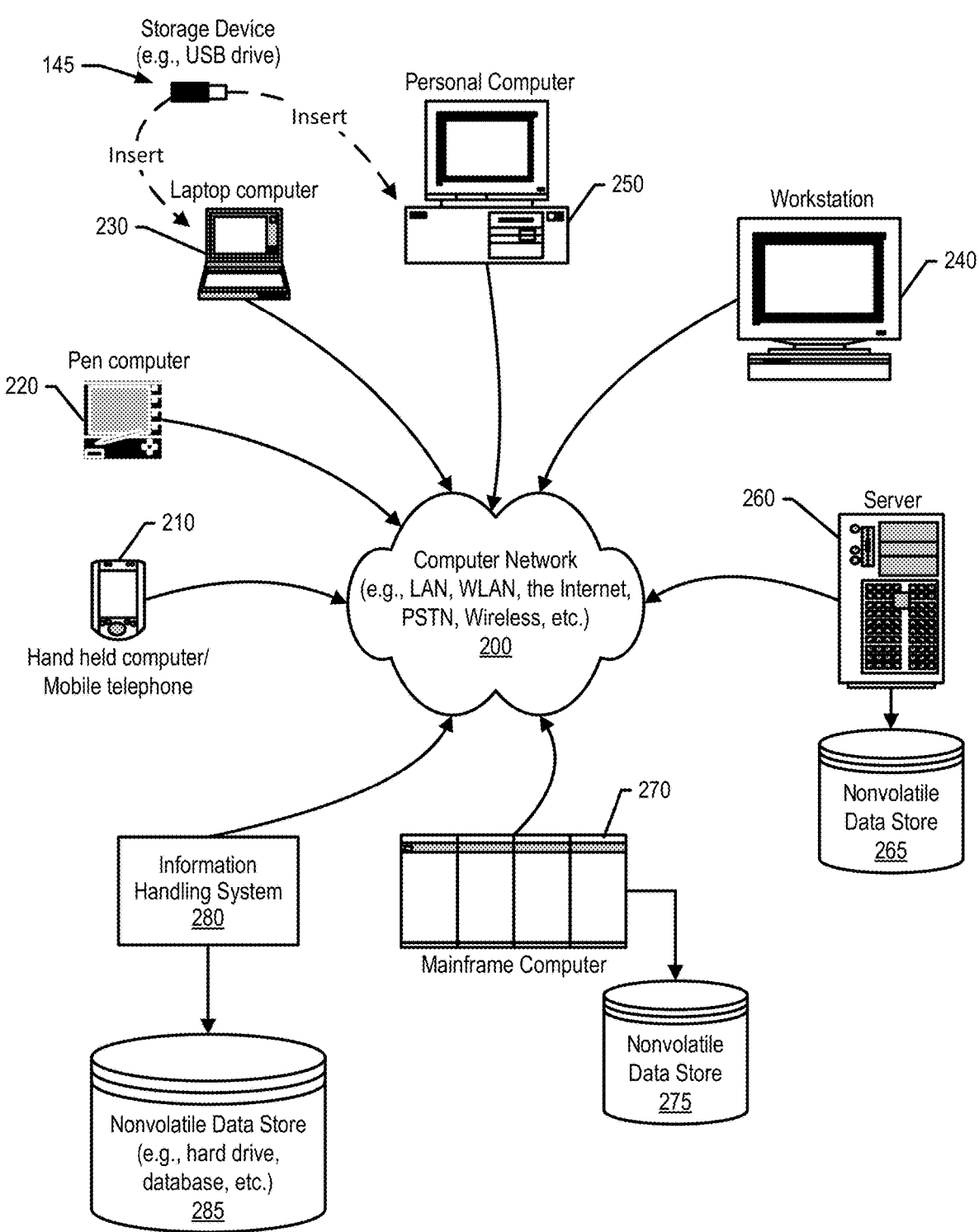
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as Moving Picture Experts Group Layer-3 Audio (MP3) players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. The embodiment of the information handling system shown in FIG. 2 includes separate nonvolatile data stores (more specifically, server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

As discussed above, a challenge found with today's decision tree implementations are identifying which attributes need to be considered at each level's decision node, and users do not have an intuitive approach to modify node splits when required to consider objectives and constraints that were not considered during an automatic decision tree building process. Therefore, it is necessary to provide an approach for a user to modify node split parameters in a decision tree so that the user can control the tree growth according to the user's constraints and objectives.

FIGS. 3 through 10 depict an approach that can be executed on an information handling system that incorporates user interaction into a decision tree fitting process by enabling a user to choose node split values that are driven by various criteria. As discussed below, the approach enables the user to choose fit functions to improve model accuracy and provide evaluation and visualization to aid user interaction. The approach supports business logic and constraints from multiple stakeholders, leverages user defined rules into a decision tree building process, and enables more interpretable results.

Figure 3:
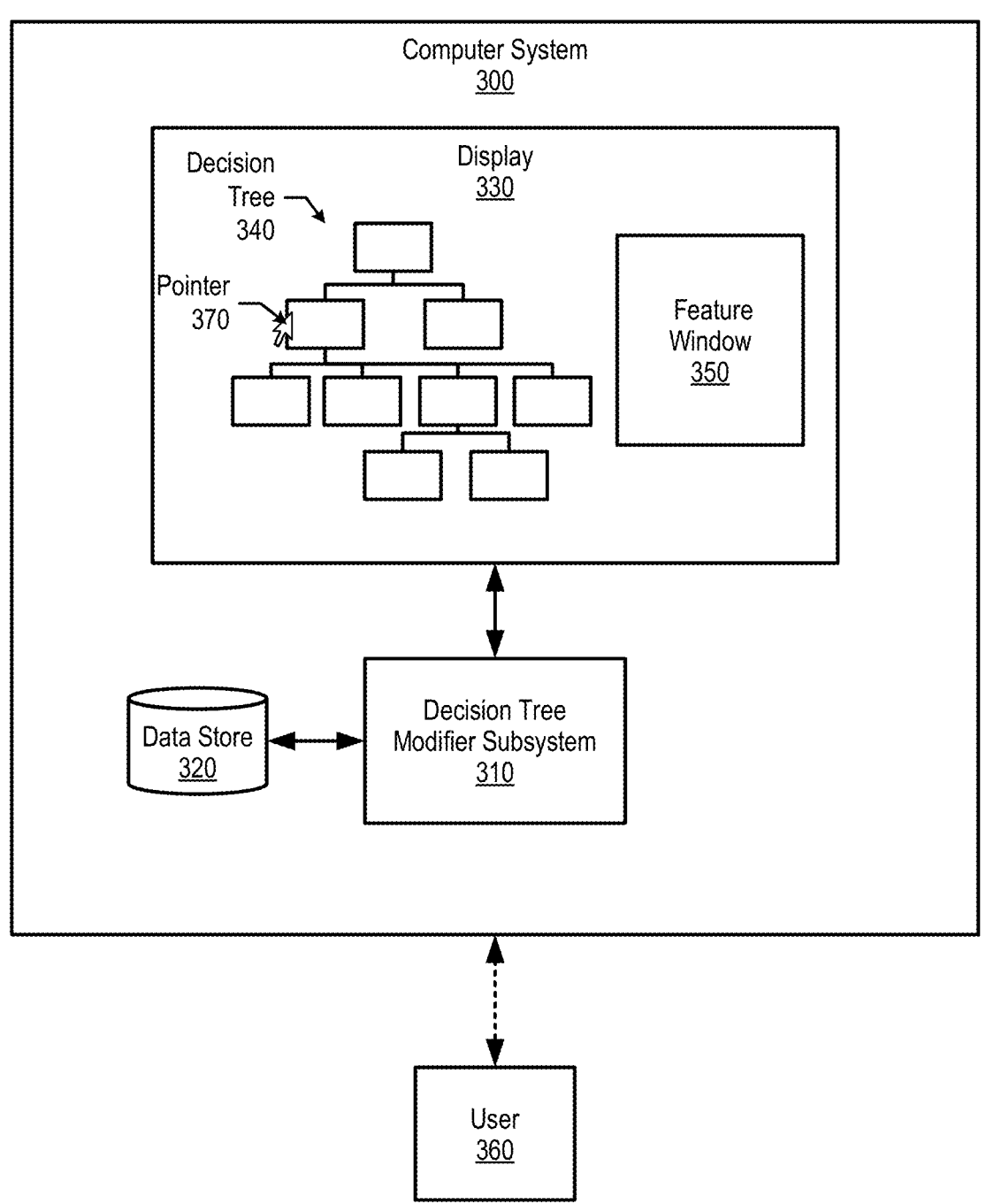
FIG. 3 is an exemplary diagram depicting a decision tree modifier subsystem that enables a user to modify node splits in a decision tree utilized by a machine learning model.

FIG. 3 is an exemplary diagram depicting a decision tree modifier subsystem that enables a user to modify node splits in a decision tree utilized by a machine learning model. Computer system 300 includes decision tree modifier subsystem 310. Decision tree modifier subsystem 310 retrieves a dataset and a decision tree built on the data from data store 320. Decision tree modifier subsystem 310 then displays decision tree 340 on display 330 for user 360 to evaluate.

When user 360 wishes to change node splitting criteria for a particular decision node, user 360 uses pointer 370 to select a particular node. In turn, decision tree modifier subsystem 310 displays a set of node split parameters corresponding to the selected node in feature window 350 (see FIGS. 5, 6, and corresponding text for further details).

User 360 then provides node split adjustment information to decision tree modifier subsystem 310, such as selecting a different feature to use for splitting, adjusted splitting values, a different fit function, and/or a derived new feature based on feature engineering. The derived feature may be a transformation of an original feature, or an interaction feature from multiple original features (see FIG. 9 and corresponding text for further details).

Decision tree modifier subsystem 310 dynamically modifies the set of node splitting parameters in the selected node and displays, in feature window 350, the modified split values, fit function in each split interval, and feature important measure in a table and a statistical plot of records. In turn, decision tree modifier subsystem 310 modifies decision tree 340 accordingly based on the modified node split criteria (see FIGS. 6 through 8 and corresponding text for further details).

In one embodiment, decision tree modifier subsystem 310 automatically searches the best fit function and optimal splitting values for the received node split feature. In another embodiment, decision tree modifier subsystem 310 generates splitting explanations to help user 360 understand the feature selection.

FIG. 4 is an exemplary diagram depicting steps taken to dynamically modify node-splitting criteria in a decision tree. FIG. 4 processing commences at 400 whereupon, at step 410, the process receives a dataset and a decision tree built by a machine learning model based on the dataset. At step 420, the process displays decision tree 370 to user 360 on display 330.

Figure 5:
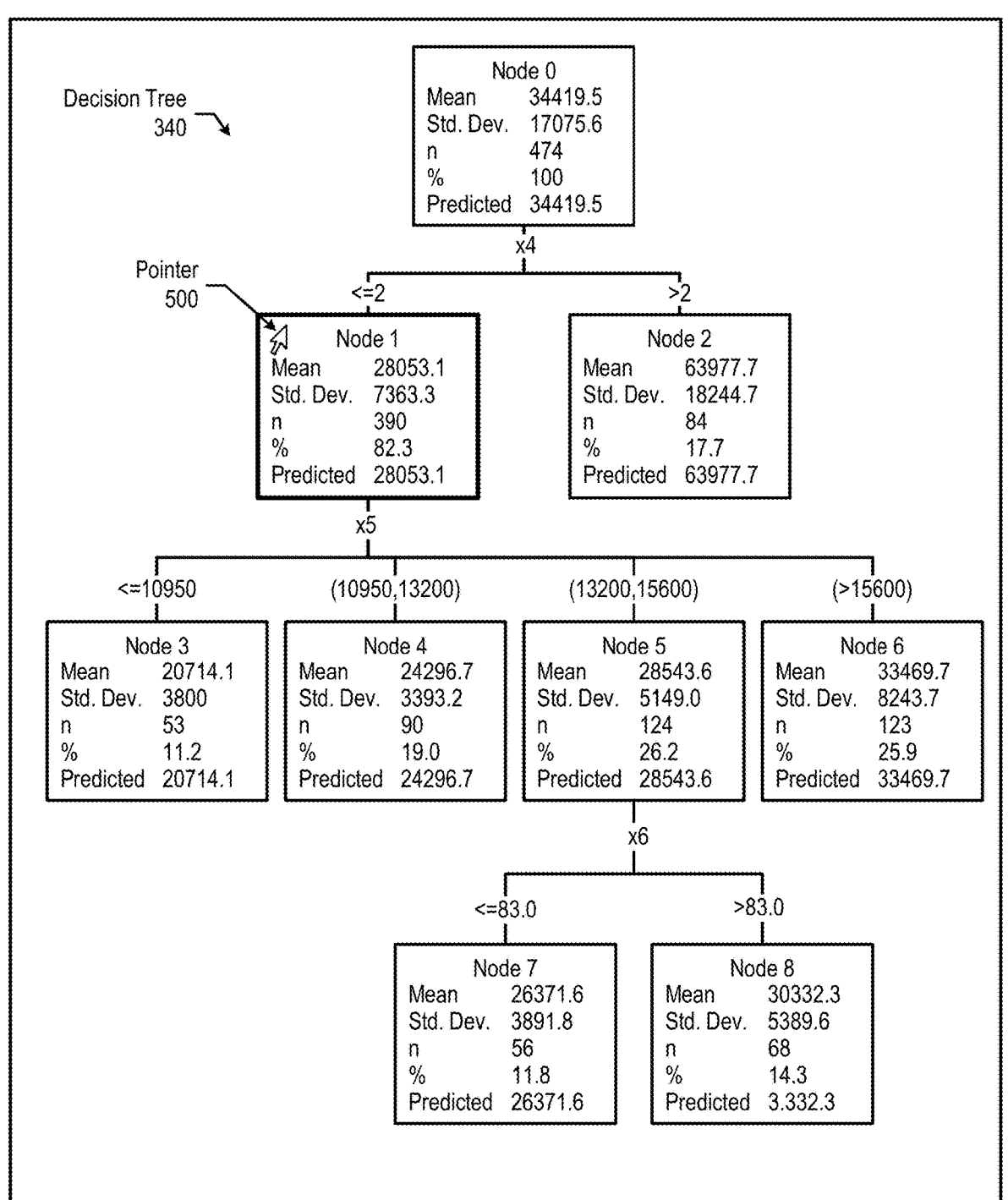
FIG. 5 is an exemplary diagram depicting a user selecting a node split to modify on a decision tree.
Figure 6:
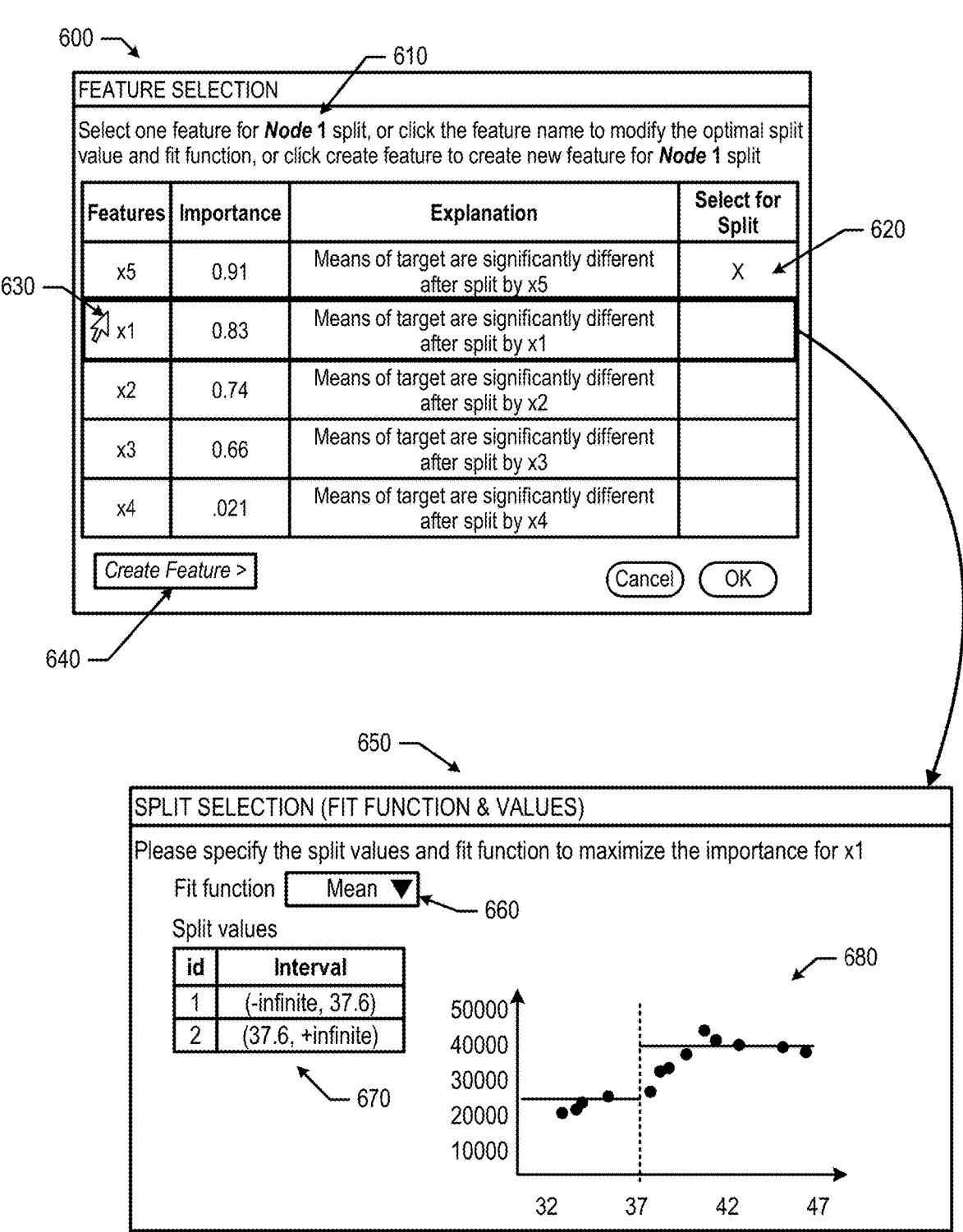
FIG. 6 is an exemplary diagram depicting a feature selection user interface window and a split selection user interface window.

At step 425, the process receives a node selection and displays a feature selection user interface based on the node selection (see FIGS. 5, 6, and corresponding text for further details). Referring to FIG. 6, user interface 600 corresponds to the selected node 1 (610) and indicator 620 indicates that x5 is the currently selected node split feature for node 1. If "Create Feature" is selected, such as button 640 shown in FIG. 6, the process opens a new user interface window that allows user 360 to create a new feature using feature engineering and new feature parameters (see FIG. 9 and corresponding text for further details).

At step 450, the process displays a split selection user interface that includes a node split table and a node split graph. Referring back to FIG. 6, split selection user interface window 650 shows a default fit function for x1 in drop down menu 660, a table showing node split values for feature x1 (670), and a node split graph showing record plots and the node split values from table 670. Drop down 650 shows a current fit function of "Mean" and shows graph 680 where the node split value is 37.6 from table 670.

Figure 7:
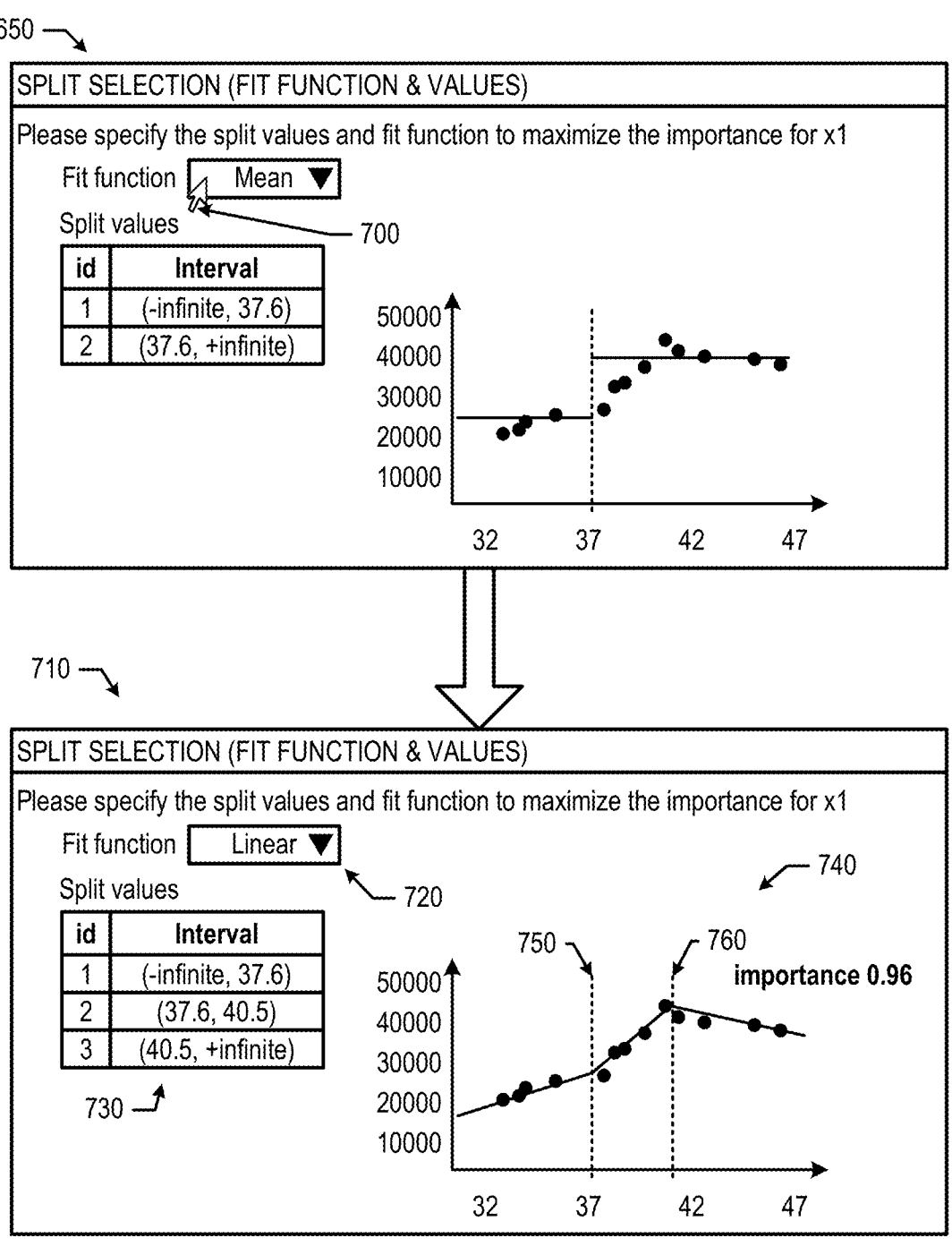
FIG. 7 is an exemplary diagram depicting a user using a split selection user interface window to modify various node split parameters.

At step 460, the process receives split values and/or fit function changes from user 360 and modifies the node split table and the node split graph accordingly (see FIG. 7 and corresponding text for further details). At step 470, the process receives user approval and updates the feature importance and explanations in the feature selection window.

Figure 9:
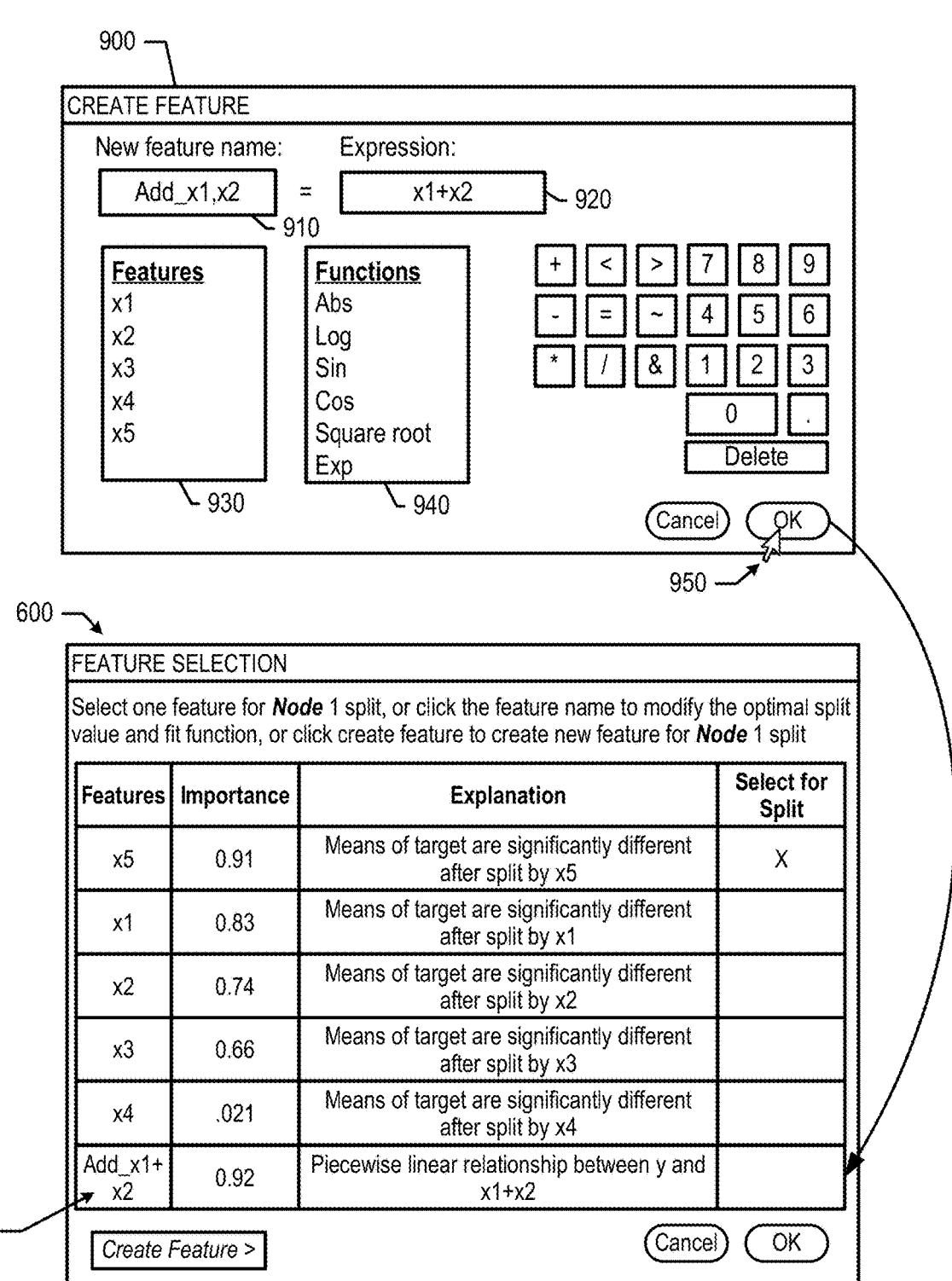
FIG. 9 is an exemplary diagram depicting a user interface window to create a new feature using feature engineering.

At step 475, the process receives a user selection to split the selected node based on the node split parameter changes and, at step 480, the process automatically splits the selected node in the decision tree view and displays the modified decision tree (See FIG. 9 and corresponding text for further details). At step 490, the process updates the machine learning model based on the modified decision tree and FIG. 4 processing thereafter ends at 495.

FIG. 5 is an exemplary diagram depicting a decision tree and user 360 selecting a node to modify.

Decision tree 340 includes nodes 0 through 8. Each one of the nodes represents a set of records in a dataset based on their corresponding feature values. Node 0 is the root node and represents each record in the set of records. Node 0 branches to node 1 and node 2 based on a record's value for feature x4. If a particular record has a feature value for x4 that is less than or equal to 2, then the record is represented in node 1. However, if the particular record has a feature value for x4 that is greater than 2, then the record is represented in node 2.

Node 1 branches to nodes 3, 4, 5, and 6 based on the value of feature X5 for a given record. If the value of X5 is less than or equal to 10950, the record is represented in node 3. If the value of x5 is between 10950 and 13200, the record is represented in node 4. If the value of x5 is between 13200 and 15600, the record is represented in node 5. And, if the value of X5 is greater than 15600 then the record is represented in node 6. Node 5 branches to nodes 7 and 8 based on the value of feature X6 in a given record. If the value of x6 is less than or equal to 83, the record is represented in node 7. If the value of x6 is greater than 83, the record is represented in node 8.

The example in FIG. 5 shows that user 360 uses pointer 500 to select node 1. In turn, decision tree modifier subsystem 310 provides node splitting information and options to user 360 in feature window 350 (see FIG. 6 and corresponding text for further details).

FIG. 6 is an exemplary diagram depicting a feature selection user interface window and a split selection user interface window. Decision tree modifier subsystem 310 displays feature selection user interface window 600 on feature window 350 when user 360 selects a node. The example in FIG. 6 shows that user interface window 600 corresponds to node 1 selection (610). Indicator 620 indicates that x5 is the currently selected node split feature for node 1. At this point, user 360 is able to i) select feature x5 and adjust split selection (fit function/split values) for feature x5; ii) select a different feature as the node split feature for node 1; or iii) create an entirely new feature through feature engineering by selecting button 640 (see FIG. 9 and corresponding text for further details).

Feature selection user interface window 600 also shows an importance column and an explanation column for each of the features. The importance column values correspond to the performance of the corresponding machine learning model by splitting by the node using the corresponding feature. The importance may be computed using a p-value of test statistics, information gain, accuracy improvement, etc.

The explanation column includes descriptions for each feature that provides insights about relationships between the feature and target.

The example in FIG. 6 shows that user 360 uses pointer 630 to select feature X1 as the node split feature for node 1. When user 360 selects feature x1, decision tree modifier subsystem 310 opens split selection user interface window 650 that shows a default fit function for x1 in drop down menu 660, a table showing node split values for feature x1 (670), and a node split graph showing record plots and the node split values from table 670. Drop down 660 shows a current fit function of "Mean" and shows graph 680 where the node split value is 37.6 from table 670. At this point, user 360 may modify the fit function through drop down 660 and/or modify the node split thresholds by modifying table 670 or graph 680 (see FIG. 7 and corresponding text for further details).

FIG. 7 is an exemplary diagram depicting a user using a split selection user interface window to modify various node split parameters. FIG. 7 shows that user 360 wishes to change the fit function in split selection user interface window 650 using pointer 700. When user 360 changes the fit function, decision tree modifier subsystem 310 displays split section user interface window 710.

Split selection user interface window 710 shows that user 360 changes the fit function to "Linear" (720) and, when the fit function changes, decision tree modifier subsystem 310 automatically changes the node split values to maximize the feature importance (table 730). In addition, decision tree modifier subsystem 310 changes graph 740 to represent a linear fit function with corresponding split value indicators 750 and 760 corresponding to the node split values shown in table 730.

User 360 can further adjust the node split values by changing the node split values in table 730 or moving split value indicators 750 and/or 760 accordingly. In turn, once user 360 is finished selecting the node split feature, the node split fit function, and the node split values, user 360 approves the changes and decision tree modifier subsystem 310 displays a modified decision tree based on the changes (see FIG. 8 and corresponding text for further details).

FIG. 8 is an exemplary diagram depicting a user confirming a set of node split parameter changes to a decision tree. Once user 360 determines the splitting parameters, including the fit function and splitting values from FIG. 6, user 360 uses pointer 800 to select x1 (and corresponding modified node split parameters). In turn, decision tree modifier subsystem 310 automatically displays modified decision tree 810 (a portion of which is shown in FIG. 8) with modified child nodes branching from node 1.

FIG. 8 shows that node 1 now splits into three child nodes 3, 4, and 5 based on the node split parameters that user 360 configured in FIG. 7. As can be seen in 810, the new child nodes are now based on feature x1 (instead of x5). Computer system 300 updates the corresponding machine learning model based on the modified decision tree accordingly and utilizes the updated machine learning for predictive modeling.

FIG. 9 is an exemplary diagram depicting a user interface window to create a new feature using feature engineering. When user 360 selects "Create Feature" button 640 in FIG. 6, decision tree modifier subsystem 310 opens user interface window 900 and enables user 360 to create a new feature to use with node splitting as discussed herein.

User 360 enters a name of the new feature in window 910 and enters an expression in window 920. User 360 may create an interaction of multiple features (e.g., x1+x2, x1*x2, etc.) and/or using a formula with existing features. User 360 then uses pointer 950 to select "OK" and decision tree modifier subsystem 310 adds the new feature as entry 960 in feature selection user interface window 600. In turn, user 360 may select the new feature entry as the node split feature for node 1.

FIG. 10 is an exemplary diagram depicting fit function options and plot options based on a selected feature and a target. Table 1000 shows that with a continuous target and a selected continuous feature, user 360 can select a mean fit function, a median fit function, a linear fit function, or a polynomial fit function. Table 1000 shows that with a continuous target and a selected categorical feature, user 360 can select a conditional mean fit function or a conditional median fit function. With a categorical target and a selected continuous feature, table 1000 shows that user 360 can select a mode fit function and a logit fit function. And, with a categorical target and a selected categorical feature, table 1000 shows that user 360 can select a mode fit function.

Table 1050 shows that with a continuous target and a selected continuous feature, user 360 can select a scatter plot. Table 1050 shows that with a continuous target and a selected categorical feature, user 360 can select a box plot by the categories of the selected feature. With a categorical target and a selected continuous feature, table 1050 shows that user 360 can select bar charts of the target in each interval of the selected feature. And, with a categorical target and a selected categorical feature, table 1050 shows that user 360 can select bar charts grouped by the categories of the selected feature.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A computer-implemented method comprising:

responsive to receiving a first user selection that selects a node in a decision tree, displaying, by one or more processors, on a user interface, (i) a set of node split parameters, (ii) a pre-calculated feature importance value for each node split parameter, and (iii) an explanation for each node split parameter, wherein:

the explanation for each node split parameter comprises a description of a relationship between the respective node split parameter and a target;

each node split parameter is computed using a p-value of test statistics; and the selected node branches to a set of child nodes in the decision tree based on the set of node split parameters;

determining, by one or more processors, that a second user selection selects a different node split feature from the set of node split parameters;

displaying, by one or more processors, a node split graph that is based on the different node split feature, wherein:

the node split graph includes (i) a statistical plot of a set of records of the node and (ii) one or more split value indicators that identify a division between child nodes of the node; and only a single axis of the node split graph corresponds to the one or more split value indicators;

receiving, by one or more processors, a third user selection comprising selecting and moving the split value indicator along the single axis on the node split graph;

responsive to receiving the third user selection, adjusting, by one or more processors, the set of node split parameters of the selected node; and modifying, by one or more processors, the decision tree based on the adjusted set of node split parameters, wherein the modified decision tree comprises a modified set of child nodes that branch from the selected node based on the adjusted set of node split parameters.

2. The computer-implemented method of claim 1, wherein the set of node split parameters comprises a selection from the group consisting of: a node split feature, a node split fit function, and a set of node split values.

3. The computer-implemented method of claim 2, further comprising:

responsive to displaying the node split graph, receiving, by one or more processors, a fourth user selection that selects a different node split fit function; and displaying, by one or more processors, a different node split graph that is based on the different node split feature and the different node split fit function.

4. The computer-implemented method of claim 3, wherein the different node split graph comprises a set of split value indicators corresponding to the set of node split values, the method further comprising:

receiving, by one or more processors, a fifth user selection that comprises modifying the set of node split values; and modifying, by one or more processors, the set of split value indicators on the different node split graph based on the modified set of node split values.

5. The computer-implemented method of claim 4, further comprising:

responsive to receiving a user authorization to modify the decision tree, displaying, by one or more processors, the modified decision tree, wherein the modified set of child nodes displayed on the modified decision tree is based on the modified feature, the different node split fit function, and the modified set of node split values.

6. The computer-implemented method of claim 3, further comprising:

responsive to displaying the different node split graph, modifying, by one or more processors, a view of the statistical plot of the set of records of the node.

7. The computer-implemented method of claim 2, further comprising:

determining, by one or more processors, that the selected different node split feature corresponds to a new node split feature;

creating, by one or more processors, the new node split feature based on one or more feature engineering parameters received from the user; and displaying, by one or more processors, the node split graph based on the new node split feature.

8. The computer-implemented method of claim 1, further comprising:

prior to receiving the first user selection:

training, by one or more processors, a machine learning model using a dataset of records, including the records of the node, wherein the trained machine learning model generates the decision tree based on the dataset; and displaying, by one or more processors, the decision tree on the user interface; and modifying, by one or more processors, the machine learning model based on the modified decision tree.

9. A computer system comprising:

a processor set;

one or more computer-readable storage media; and program instructions stored on the one or more computer-readable storage media to cause the processor set to perform operations comprising:

responsive to receiving a first user selection that selects a node in a decision tree, displaying, on a user interface, (i) a set of node split parameters, (ii) a pre-calculated feature importance value for each node split parameter, and (iii) an explanation for each node split parameter, wherein:

the explanation for each node split parameter comprises a description of a relationship between the respective node split parameter and a target;

each node split parameter is computed using a p-value of test statistics; and the selected node branches to a set of child nodes in the decision tree based on the set of node split parameters;

determining that a second user selection selects a different node split feature from the set of node split parameters;

displaying a node split graph that is based on the different node split feature, wherein:

the node split graph includes (i) a statistical plot of a set of records of the node and (ii) one or more split value indicators that identify a division between child nodes of the node; and only a single axis of the node split graph corresponds to the one or more split value indicators;

receiving a third user selection comprising selecting and moving the split value indicator along the single axis on the node split graph;

responsive to receiving the third user selection, adjusting the set of node split parameters of the selected node; and modifying the decision tree based on the adjusted set of node split parameters, wherein the modified decision tree comprises a modified set of child nodes that branch from the selected node based on the adjusted set of node split parameters.

10. The computer system of claim 9, wherein the set of node split parameters comprises a selection from the group consisting of: a node split feature, a node split fit function, and a set of node split values.

11. The computer system of claim 10, wherein the operations further comprise:

responsive to displaying the node split graph, receiving a fourth user selection that selects a different node split fit function; and displaying a different node split graph that is based on the different node split feature and the different node split fit function.

12. The computer system of claim 11, wherein the different node split graph comprises a set of split value indicators corresponding to the set of node split values, and wherein the operations further comprise:

receiving a fifth user selection that comprises modifying the set of node split values; and modifying the set of split value indicators on the different node split graph based on the modified set of node split values.

13. The computer system of claim 12, wherein the operations further comprise:

responsive to receiving a user authorization to modify the decision tree, displaying the modified decision tree, wherein the modified set of child nodes displayed on the modified decision tree is based on the modified feature, the different node split fit function, and the modified set of node split values.

14. The computer system of claim 11, wherein the operations further comprise:

responsive to displaying the different node split graph, modifying a view of the statistical plot of the set of records of the node.

15. The computer system of claim 10, wherein the operations further comprise:

determining that the selected different node split feature corresponds to a new node split feature;

creating the new node split feature based on one or more feature engineering parameters received from the user; and displaying the node split graph based on the new node split feature.

16. The computer system of claim 9, wherein the operations further comprise:

prior to receiving the first user selection:

training a machine learning model using a dataset of records, including the records of the node, wherein the trained machine learning model generates the decision tree based on the dataset; and displaying the decision tree on the user interface; and modifying the machine learning model based on the modified decision tree.

17. A computer program product comprising:

one or more computer-readable storage media; and program instructions stored on the one or more computer-readable storage media to perform operations comprising:

responsive to receiving a first user selection that selects a node in a decision tree, displaying, on a user interface, (i) a set of node split parameters, (ii) a pre-calculated feature importance value for each node split parameter, and (iii) an explanation for each node split parameter, wherein:

the explanation for each node split parameter comprises a description of a relationship between the respective node split parameter and a target;

each node split parameter is computed using a p-value of test statistics; and the selected node branches to a set of child nodes in the decision tree based on the set of node split parameters;

determining that a second user selection selects a different node split feature from the set of node split parameters;

displaying a node split graph that is based on the different node split feature, wherein:

the node split graph includes (i) a statistical plot of a set of records of the node and (ii) one or more split value indicators that identify a division between child nodes of the node; and only a single axis of the node split graph corresponds to the one or more split value indicators;

receiving a third user selection comprising selecting and moving the split value indicator along the single axis on the node split graph;

responsive to receiving the third user selection, adjusting the set of node split parameters of the selected node; and modifying the decision tree based on the adjusted set of node split parameters, wherein the modified decision tree comprises a modified set of child nodes that branch from the selected node based on the adjusted set of node split parameters.

18. The computer program product of claim 17, wherein the set of node split parameters comprises a selection from the group consisting of: a node split feature, a node split fit function, and a set of node split values.

19. The computer program product of claim 18, wherein the operations further comprise:

responsive to displaying the node split graph, receiving a fourth user selection that selects a different node split fit function; and displaying a different node split graph that is based on the different node split feature and the different node split fit function.

20. The computer program product of claim 19, wherein the different node split graph comprises a set of split value indicators corresponding to the set of node split values, and wherein the operations further comprise:

receiving a fifth user selection that comprises modifying the set of node split values; and modifying the set of split value indicators on the different node split graph based on the modified set of node split values.

21. The computer program product of claim 20, wherein the operations further comprise:

responsive to receiving a user authorization to modify the decision tree, displaying the modified decision tree, wherein the modified set of child nodes displayed on the modified decision tree is based on the modified feature, a modified fit function, and the modified set of node split values.

22. The computer program product of claim 18 wherein the operations further comprise:

determining that the selected different node split feature corresponds to a new node split feature;

creating the new node split feature based on one or more feature engineering parameters received from the user; and displaying the node split graph based on the new node split feature.

23. The computer program product of claim 17 wherein the operations further comprise:

prior to receiving the first user selection:

training a machine learning model using a dataset of records, including the records of the node, wherein the trained machine learning model generates the decision tree based on the dataset; and displaying the decision tree on the user interface; and modifying the machine learning model based on the modified decision tree.

24. A computer-implemented method comprising:

training, by one or more processors, a machine learning model using a dataset, wherein the trained machine learning model generates a decision tree based on the dataset;

displaying, by one or more processors, the decision tree on a user interface, wherein the decision tree comprises a plurality of nodes;

responsive to receiving a first user selection that selects one of the plurality of nodes in the decision tree, displaying, by one or more processors, (i) a set of node split parameters, (ii) a pre-calculated feature importance value for each node split parameter, and (iii) an explanation for each node split parameter wherein:

the explanation for each node split parameter comprises a description of a relationship between the respective node split parameter and a target;

each node split parameter is computed using a p-value of test statistics; and the selected node branches to a set of child nodes in the plurality of nodes based on the set of node split parameters;

determining, by one or more processors, that a second user selection selects a different node split feature from the set of node split parameters;

displaying, by one or more processors, a node split graph that is based on the different node split feature, wherein:

the node split graph includes (i) a statistical plot of a set of records of the node and (ii) one or more split value indicators that identify a division between child nodes of the node; and only a single axis of the node split graph corresponds to the one or more split value indicators;

receiving, by one or more processors, a third user selection comprising selecting and moving the split value indicator along the single axis on the node split graph;

responsive to receiving the third user selection, adjusting, by one or more processors, the set of node split parameters of the selected node;

modifying, by one or more processors, the decision tree based on the adjusted set of node split parameters, wherein the modified decision tree comprises a modified set of child nodes that branch from the selected node based on the adjusted set of node split parameters; and modifying, by one or more processors, the machine learning model based on the modified decision tree.

* * * * *